United States Patent [19]

Kennedy et al.

[11] Patent Number: 5,438,169

[45] Date of Patent: Aug. 1, 1995

[54] APPARATUS AND METHOD FOR DETERMINING THE QUALITY OF CLAMPING OF A BOREHOLE SEISMIC SENSOR SYSTEM TO THE WALL OF A WELLBORE

[75] Inventors: William S. Kennedy, Menlo Park; Kenneth J. Wolfe, Sunnyvale, both of Calif.

[73] Assignee: Western Atlas International, Inc., Houston, Tex.

[21] Appl. No.: 298,056

[22] Filed: Aug. 30, 1994

[51] Int. Cl.$^6$ .............................................. G01V 1/20
[52] U.S. Cl. ..................... 181/102; 367/25; 367/38; 367/911; 175/40; 166/250; 73/152
[58] Field of Search ............... 367/25, 35, 36, 38, 367/56, 911; 181/101, 102, 105, 108; 175/40; 166/250; 73/151, 152

[56] References Cited

U.S. PATENT DOCUMENTS

| | | |
|---|---|---|
| 4,715,469 | 12/1987 | Yasuda et al. |
| 4,979,585 | 12/1990 | Chesnutt ............... 181/102 |
| 5,189,262 | 2/1993 | Engler et al. ............. 181/102 |

OTHER PUBLICATIONS

Vertical Seismic Profiling, 2nd enl. ed., Hardage, Bob A., Geophysical Press Limited, London, 1985, pp. 36, 263, 268–269.

Atlas Wireline Services Brochure "AWS-1300 GM Downhole Receiver Tool", 1994.

Primary Examiner—J. Woodrow Eldred
Attorney, Agent, or Firm—Richard A. Fagin

[57] ABSTRACT

The invention is a method and apparatus for measuring the quality of acoustic coupling between a wellbore wall and a borehole seismic sensor system. The system includes the steps of positioning the system at a desired depth in the wellbore and activating a locking mechanism powered by a DC motor. The motor then has broadband AC applied to it to cause vibration of the system. The output of at least one seismic sensor in the system is processed in a spectrum analyzer, and the result is checked for the presence or absence of natural resonance of the system. In a particular embodiment, the system response to the broadband AC is used to generate an inverse filter operator to compensate the system response to a geophysical survey for partial acoustic coupling.

18 Claims, 3 Drawing Sheets

APPARATUS AND METHOD FOR DETERMINING THE QUALITY OF CLAMPING OF A BOREHOLE SEISMIC SENSOR SYSTEM TO THE WALL OF A WELLBORE

BACKGROUND OF THE INVENTION

1. Field of the Invention

The present invention is related to the field of geophysical exploration. More specifically, the present invention is related to the use of borehole seismic sensor systems.

2. Description of the Related Art

A borehole seismic sensor system is an instrument adapted for traversing a wellbore penetrating the earth, which is used for converting seismic energy into a signal representing the time-varying amplitude of the seismic energy, after the seismic energy has passed through the earth to the wellbore.

Borehole seismic sensor systems are commonly used for conducting checkshot and vertical seismic profile, or VSP, surveys. Checkshot and VSP surveys are typically used to correlate a geophysical survey conducted at the earth's surface to the depth of various formations in the earth. For example, "Vertical Seismic Profiling", by Bob A. Hardage, Geophysical Press, London, 1985, describes the methodology and applications of checkshot and VSP surveys in detail.

A borehole seismic sensor system must be able to function while withstanding the environment in the wellbore, which can frequently include temperatures exceeding 300 degrees Fahrenheit, and pressures exceeding 15,000 PSI. A borehole seismic sensor system adapted to withstand the environment of the wellbore can be relatively heavy. Efficient transfer of seismic energy requires good acoustic coupling of the seismic sensor system to the wellbore wall. Good acoustic coupling is facilitated by designing the seismic sensor system so that the weight of the system be kept as small as possible while still being able to withstand the environment in the wellbore.

A clamping mechanism is typically part of the borehole seismic sensor system. The clamping mechanism forces a housing, which forms part of the system, into contact with the wall of the wellbore so that friction between the housing and wellbore wall causes acoustic coupling of the housing to the wall of the wellbore. The housing can contain sensors which detect seismic energy by generating a signal in response to acoustically induced motion of the housing. Seismic energy reaching the wellbore must be transferred to the housing entirely by the friction between the wall of the wellbore and the housing in order to be detected by the sensors, so the clamping mechanism must generate enough force both to support the entire weight of the system in the wellbore and to enable coherent transfer of seismic energy from the wall of the wellbore to the housing.

Inadequate clamping force may enable relative movement between the housing and the wellbore wall, which can result in distortion of the seismic signal detected by the sensors in the housing. The requirement for an adequate amount of clamping force is described, for example, in "Vertical Seismic Profiling" (page 36). Clamping mechanisms which provide adequate force for holding the housing in contact with the wall of the borehole are known in the art. For example, "The AWS-1300G Downhole Geophone" Atlas Wireline , Services, Houston, Tex., 1993, describes a clamping mechanism which generally provides adequate clamping force.

Even if the clamping force generated by the clamping mechanism is generally adequate to provide good acoustic coupling of the system to the wellbore wall, the actual quality of acoustic coupling may vary within any particular wellbore, because the acoustic coupling quality is dependent on the friction between the housing and the wellbore wall, not on the clamping force alone. The friction which is actually generated by the clamping mechanism forcing the housing against the wellbore wall can be heavily dependent on the condition of the wellbore wall. A rough, or rugose wellbore wall can be caused by various conditions encountered while drilling the wellbore, which include soft earth formations. A rugose wellbore wall can cause the contact surface area between the housing and the wellbore wall to be significantly less than with a smooth wellbore wall, thereby resulting in inadequate friction for good acoustic coupling.

It is desirable to be able to determine the quality of acoustic coupling of the system to the wall of the wellbore at a particular position within the wellbore, so that if the particular position is determined to have poor quality acoustic coupling, then the system can be moved to another position which may have better quality coupling.

A method for determining the quality of the acoustic coupling between the wellbore wall and the housing is known in the art. The method known in the art uses an additional geophone receiver, located within the housing, to act as a "shaker", whereby an electrical signal generated either at the earth's surface or in the system itself, is converted by the additional geophone receiver into an oscillating mechanical force which is applied to the system. The quality of the acoustic coupling between the housing and the wellbore wall is determined by analyzing the response of the system to the oscillating force applied by the shaker.

The method known in the art is difficult because the additional geophone receiver must be added to the system. The additional weight of the extra geophone receiver, associated signal processing circuitry and the larger housing needed to enclose the extra geophone receiver and circuitry, all add to the weight of the system which must be clamped to the wellbore wall, thereby making good acoustic coupling more difficult.

It is an object of the present invention to provide a shaker means, or means of exciting the borehole seismic sensor system without an additional geophone receiver and associated circuitry, so that the mass of the borehole seismic sensor system is not substantially increased over the mass of a system without an integral shaker means.

SUMMARY OF THE INVENTION

The present invention is a method of measuring the acoustic coupling between the wall of a wellbore and a borehole seismic sensor system. The method includes the steps of: deploying a borehole seismic sensor system in a wellbore at a depth of interest; activating a locking mechanism comprising a bi-directional DC powered motor, gear reduction, worm drive and recirculating ball nut, the mechanism forming part of the system; applying a broadband alternating current to the motor; receiving the signal generated by at least one seismic sensor forming part of the system; and sending the signal to a spectrum analyzer for analyzing the frequency response of the signal for determining the quality of the clamping force provided by the locking mechanism at the depth of interest.

The invention is also an apparatus for determining the quality of clamping of a borehole seismic sensor system in a wellbore comprising a broadband AC generator and a spectrum analyzer used in combination with a borehole seismic sensor system.

In a particular embodiment of the invention, the output of the spectrum analyzer is used to generate an inverse filter operator which is then applied to the results of a geophysical survey, whereby the system response to the broadband AC can be used to compensate the results of the geophysical survey for partial acoustic coupling of the system to the wall of the wellbore.

DESCRIPTION OF THE PREFERRED EMBODIMENT

Figure 1:
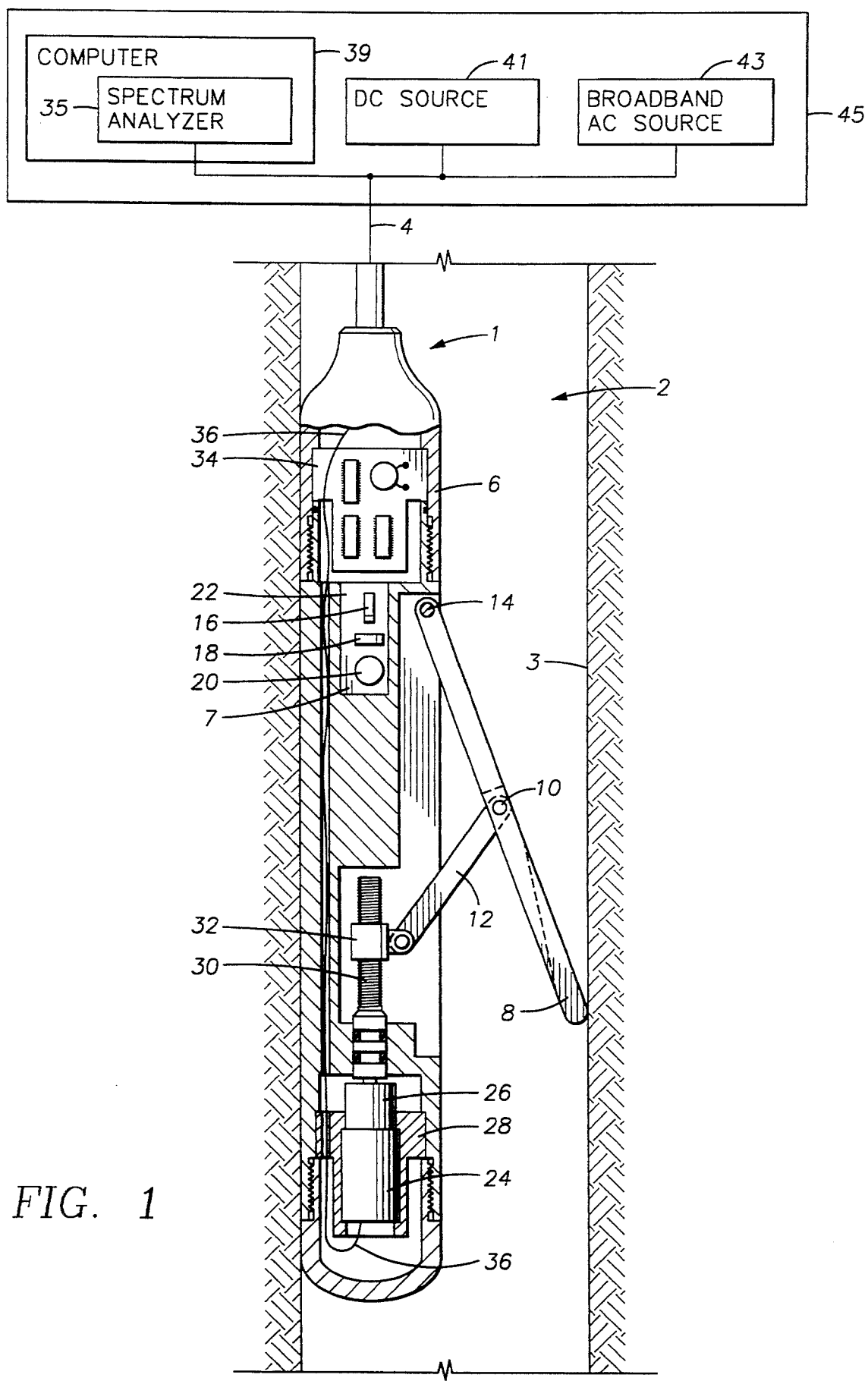
FIG. 1 is a diagram of the components of the borehole seismic sensor system.

FIG. 1 shows a borehole seismic sensor system 1 as it is typically used in a wellbore 2. Typically, the system 1 is lowered into the wellbore by means of an armored electrical cable 4 which comprises at least one insulated electrical conductor 36. The system 1 can be contained in a housing 6 adapted to traverse the wellbore 2, the housing 6 being particularly adapted to exclude fluid (not shown) which may be present in the wellbore 2, from entering an interior chamber 7. The chamber 7 can contain electronic components such as a signal processing unit 34. When a depth of interest (not shown) is reached, the system 1 is locked in place by activation of a locking mechanism comprising: a bi-directional DC powered electric motor 24, which is coupled to a reduction gear 26; a worm drive 30 coupled to the reduction gear 26; a recirculating ball nut 32 which travels axially along the worm drive 30 as the worm drive 30 is rotated; and a linkage 12 pivotally attached to the ball nut 32 at one end, and to a first pivot 10 forming part of a locking arm 8 at the other end. The locking arm 8 is attached to the housing 6 at one end by a second pivot 14. The other end of the arm 8 contacts the wall 3 of the wellbore 2 when the arm 8 is extended.

Application of a DC voltage to the motor 24, from a source 41 at the surface, causes the motor 24 to rotate in one direction, which through the reduction gear 28 causes the worm 30 to turn. Rotation of the worm 30 causes axial motion of the ball nut 32, which in turn causes extension of the linkage 12, and thereby the locking arm 8. The arm 8 can be retracted by application of a DC voltage to the motor 24 which is opposite in polarity to the voltage used to extend the arm 8, since the motor 24 rotates in the opposite direction when reverse polarity DC is applied to the motor 24.

Figure 2:
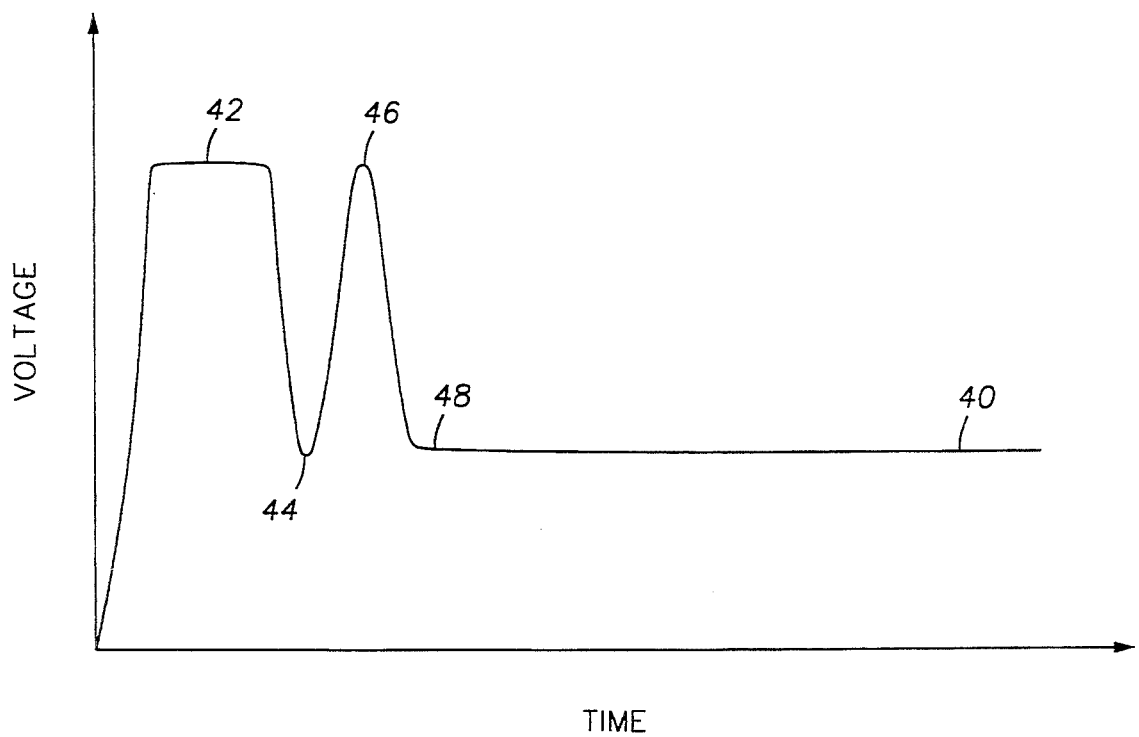
FIG. 2 is a graphic representation of the electric current supplied to a motor in the system which is typically used to set a locking mechanism.

The magnitude of the voltage applied to the motor 24 at any constant current can be diagnostic of whether the arm 8 has been fully extended or retracted. FIG. 2 shows a graphic representation of the voltage applied to the motor 24 during extension of the arm 8. At 42 the voltage is increased to the operating value, which in this embodiment can be 50 volts measured at the motor 24. The current is initially limited by the DC source 41 to about 400 milliamperes, so that as the arm 8 contacts the wall (shown as 3 in FIG. 1) and is forced to stop, the voltage across the motor 24 drops, as shown at 44. To apply extra locking force, the DC voltage is momentarily increased, as shown at 46, and then the DC voltage is reduced so that a constant current, which in this embodiment can be about 300 milliamperes, is applied to the motor 24 for the duration of the geophysical survey at the depth of interest, as shown at 40. The constant DC applied to the motor 24 prevents unlocking of the arm 8 during the geophysical survey.

Figure 3:
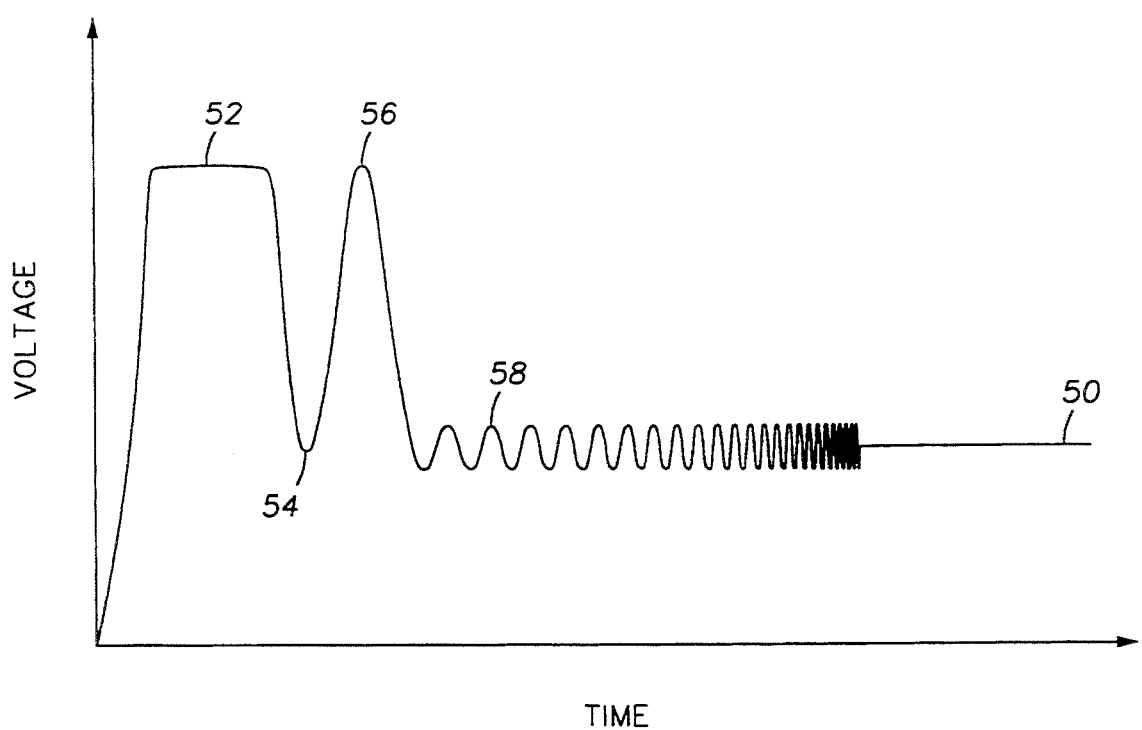
FIG. 3 is a graphic representation of the electric current applied to the motor including the broadband AC used to shake the geophone system.

FIG. 3 shows the operation of the system 1 including applying a broadband alternating current (AC) from a source (shown as 43 in FIG. 1) located at the earth's surface, to the motor 24, after locking the arm 8 is engaged with the wall 3, to cause the system (shown as 1 in FIG. 1) to vibrate at the frequency of the AC. The method of setting and locking the arm 8 is substantially the same as the operation of the system 1 without application of the AC, as shown at 52: extension of the arm 8, at 54; the arm 8 contacting the wall 3; and at 56, application of extra voltage to lock the arm 8 in place.

At 58, broadband alternating current (AC) comprising a frequency range which in this embodiment can be a continuous sweep from 10 to 500 Hz is applied to the motor 24. The continuous sweep relationship of frequency with respect to time of the broadband AC is known in the art. It is contemplated that broadband AC could also be applied to the motor 24 in the form of short duration pulses each having a single, discrete frequency, at a plurality of discrete frequencies over the range of 10 to 500 Hz. In this embodiment the AC can have a peak-to-peak amplitude of about 3 volts. The AC causes time-varying increases and reductions in the torque applied by the motor 24 to the reduction gear 26, the time-varying increases and decreases being substantially time coincident with the magnitude of the applied AC voltage. These time-varying changes in torque cause equivalent time-varying changes in the reactive torque exerted by the housing (shown as 6 in FIG. 1) through a motor mount (shown as 28 in FIG. 1) to the motor 24. The time-varying changes in reactive torque thereby acoustically energize the housing 6.

Detection of the acoustic energy transferred to the housing 6 and the wall 3 can be better understood by referring back to FIG. 1. Disposed within the housing 6 is a frame 22 which is rigidly mounted to the interior of the housing 6. In this embodiment three geophones 16, 18, 20 are pivotally mounted inside the frame 22 so that the geophones 16, 18, 20 remain oriented at right angles to each other, or orthogonally. Orthogonal orientation of the geophones 16, 18, 20 enables detection of components of motion of the housing on all three coordinate axes. The geophones 16, 18, 20 are electrically connected to the signal processing unit 34 which amplifies and filters signals generated by the geophones 16, 18, 20 as a result of detection of motion of the housing 6, the motion being particularly caused by acoustic energy imparted by shaking caused by the AC applied to the motor 24. Output signals from the signal processing unit 34 are imparted to the cable 4, and are then transmitted to a spectrum analyzer 35 located at the earth's surface.

Figure 4:
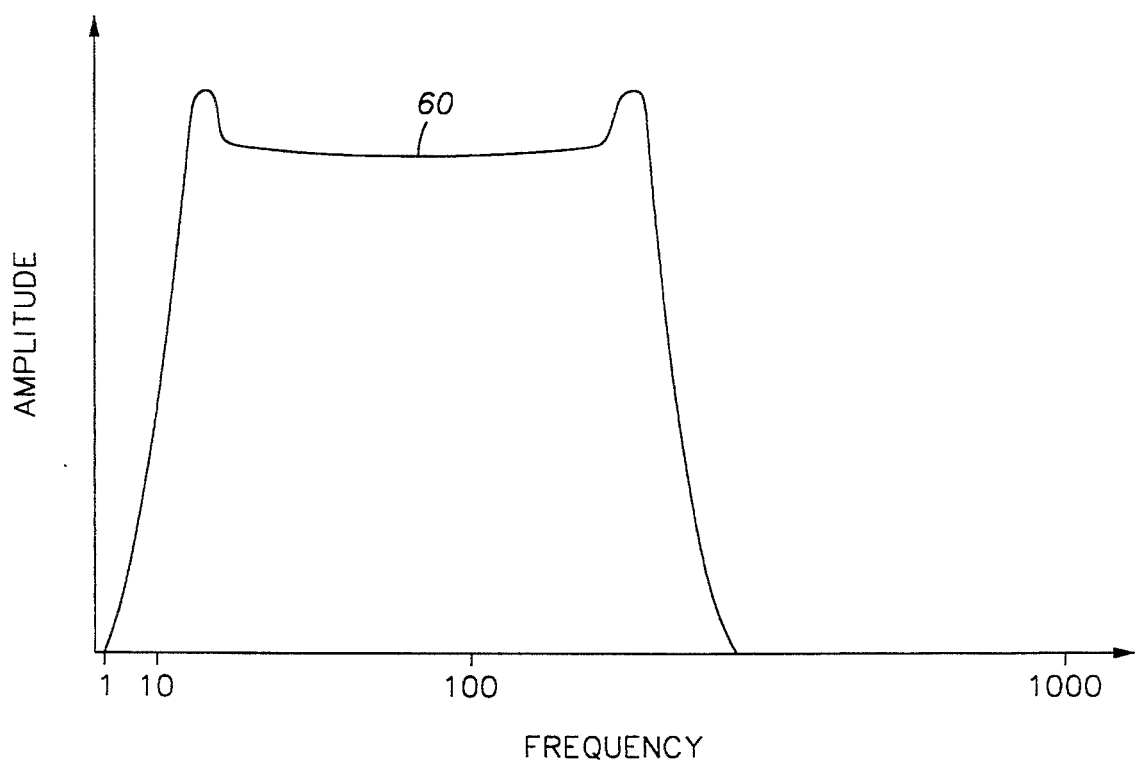
FIG. 4 is a graphic representation of the output of the spectrum analyzer in the case of good coupling between the wall of the wellbore and the system.

The analysis of the signals by the spectrum analyzer 35 can be better understood by referring to FIG. 4. The analyzer 35, which in this embodiment is a component of the regular surface equipment (shown as 45 in FIG. 1) used for acquisition of borehole seismic surveys, comprises a Fast Fourier Transform (FFT) program resident in a computer (shown as 39 in FIG. 1). FIG. 4 shows the output of the analyzer 35 resulting from processing the output of the signal processing unit (shown as 34 in FIG. 1) when the motor 24 is energized by the broadband AC. Because the broadband AC is at nearly constant amplitude through the entire frequency range, which in this embodiment can be 10 to 500 Hz, if the system (shown as 1 in FIG. 1) is well coupled to the wall 3, then no spurious resonances should be apparent at any frequency in the frequency range. As shown at 60, the relatively flat response indicates that the system 1 is well coupled to the wall 3. A change in the response as shown at 60 of less than about 5 dB over the frequency range can generally be considered to be indicative of good acoustic coupling.

Figure 5:
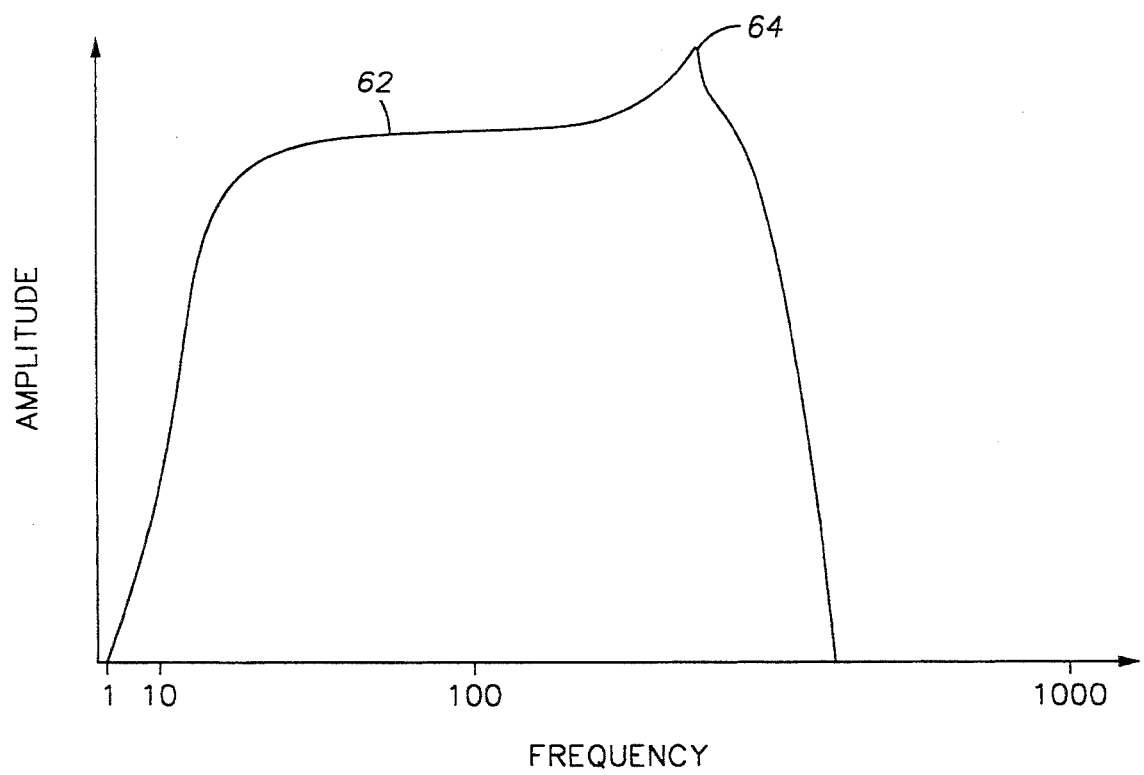
FIG. 5 is a graphic representation of the output of the spectrum analyzer in the case of poor coupling between the wall of the wellbore and the system.

FIG. 5 shows the output of the analyzer 35 if the system 1 is poorly coupled to the wall 3. At 64, a peak, which in this embodiment occurs at about 380 Hz, represents the natural resonance of the system 1 in the absence of damping. At 62, the response of the system 1 exhibits an increasing amplitude as a function of frequency, which is the characteristic response of the system 1 when it is not damped. An undamped response can be caused by poor mechanical coupling of the system 1 to the wall 3.

After the geophysical survey is conducted at each depth of interest in the wellbore 2, the process of relocking the system 1, applying broadband AC to the motor 24 and analyzing the output of the spectrum analyzer 35 for evidence of natural resonance of the system 1 is repeated. If a particular depth of interest is indicated to have poor acoustic coupling between the system 1 and the wall 3, the arm 8 can be retracted, the system 1 moved slightly, and the arm 8 reset, until good coupling is indicated.

DESCRIPTION OF A PARTICULAR EMBODIMENT

In some cases, due to the condition of the wall 3, it is not possible to obtain high-quality acoustic coupling between the wall 3 of the wellbore 2 and the system 1. Referring back to FIG. 5, the resonant peak shown at 64 can still be present to some degree in the case of partial acoustic coupling. In these cases, the response of the system 1 may not faithfully represent seismic energy which energizes the tool during a geophysical survey. It is possible to compensate for the response of the system 1 by using the output of the analyzer 35, obtained as a result of the application of the broadband AC, to design an inverse filter operator to attenuate distortion in the response of the system 1. Design of inverse filter operators is known in the art. For example, a computer program which can design the inverse filter operator, based on the system 1 response to application of the broadband AC, forms part of the programming of wellbore geophysical survey processing software sold by Atlas Wireline Services under the trade name "SEISLINK-X". In this embodiment, the output of the analyzer 35 is processed by the software to generate an inverse filter operator, and the inverse filter operator is applied to, or convolved with, the result of the geophysical survey to compensate for the system 1 response resulting from partial acoustic coupling.

DESCRIPTION OF AN ALTERNATIVE EMBODIMENT

Referring back to FIG. 1, the geophones 16, 18, 20 of the first embodiment, in this embodiment can be substituted by accelerometers which are rigidly mounted to the frame 22.

We claim:

1. A method of evaluating the acoustic coupling between a borehole seismic sensor system and the wall of a wellbore, the system comprising at least one seismic sensor and a locking arm powered by a motor, the method comprising the steps of:

lowering the borehole seismic sensor system into the wellbore to a depth of interest in the wellbore, the system electrically connected to equipment at the earth's surface by an electrical cable;

extending the locking arm until the arm contacts the wall of the wellbore, by applying a direct current to the motor;

applying a broadband alternating current to the motor, the alternating current having a substantially constant amplitude at a plurality of frequencies within a predetermined frequency range;

detecting signals generated by the at least one seismic sensor;

transmitting the signals to the earth's surface by the electrical cable; and processing the signals in a spectrum analyzer and generating an output representing amplitude of the signals as a function of frequency.

2. The method as defined in claim 1 wherein the predetermined frequency range comprises the range of 10 to 500 Hz.

3. The method as defined in claim 2 wherein the broadband alternating current comprises a continuous sweep of frequencies in the predetermined frequency range.

4. The method as defined in claim 2 wherein the broadband alternating current comprises pulses of discrete-frequency current at a plurality of frequencies in the predetermined frequency range.

5. The method as defined in claim 1 wherein the spectrum analyzer comprises a Fast Fourier Transform computer program.

6. The method as defined in claim 1 further comprising the step comparing the output of the analyzer with a functional relationship representing various amounts of acoustic coupling.

7. The method as defined in claim 1 wherein the at least one sensor comprises a geophone.

8. The method as defined in claim 1 wherein the at least one sensor comprises an accelerometer.

9. An apparatus for measuring the acoustic coupling between a borehole seismic sensor system and the wall of a wellbore, the apparatus comprising:

a housing adapted to traverse the wellbore;

at least one seismic sensor, disposed within the housing, the at least one sensor adapted to detect motion of the housing and generate signals as a result of detecting motion of the housing;

a signal processing unit, disposed within the housing and electrically connected to the at least one sensor, the signal processing unit adapted to transmit of the signals to the earth's surface;

a locking mechanism, disposed within the housing, the mechanism comprising a locking arm and a bi-directional direct current powered motor cooperatively attached to the arm, the locking mechanism adapted to force the housing into contact with the wall of the wellbore upon application of a direct current to the motor;

a source of broadband alternating current, selectively operating within a predetermined frequency range, the source electrically connected to the motor; and a spectrum analyzer, electrically connected to the output of the signal processing unit, the analyzer capable of providing at least one output representing signal amplitude as a function of frequency component, so that when the locking mechanism is set to force the housing into contact with the borehole wall, application of the broadband alternating current to the motor causes motion of the housing, the at least one sensor detecting the motion generates signals which are filtered and amplified by the signal processing unit, and transmitted to the spectrum analyzer, to characterize the frequency response of the motion of the housing.

10. The apparatus as defined in claim 9 wherein the predetermined frequency range comprises the range of 10 to 500 Hz.

11. The apparatus as defined in claim 10 wherein the broadband alternating current comprises a continuous sweep of frequencies within the predetermined frequency range.

12. The apparatus as defined in claim 10 wherein the broadband alternating current comprises pulses of discrete-frequency current at a plurality of frequencies within the predetermined frequency range.

13. The apparatus as defined in claim 9 wherein the locking mechanism further comprises:

a gear reduction drive, rotationally coupled to the motor;

a worm drive, rotationally coupled to the output of the gear reduction drive;

a recirculating ball nut, attached to the worm drive; and a link, pivotally attached to the ball nut at one end and pivotally attached to the arm at the other end, so that rotation of the motor causes rotation of the worm, which causes axial motion of the ball nut and one end of the link, thereby extending the arm.

14. The apparatus as defined in claim 9 wherein the signal processing unit comprises an amplifier and a bandpass filter.

15. The apparatus as defined in claim 9 wherein the spectrum analyzer comprises a Fast Fourier Transform computer program.

16. The apparatus as defined in claim 9 wherein the at least one seismic sensor comprises a geophone.

17. The apparatus as defined in claim 9 wherein the at least one seismic sensor comprises an accelerometer.

18. A method of adjusting a response of a borehole seismic sensor system comprising a DC powered locking mechanism, to compensate for partial acoustic coupling with the wall of a wellbore, the method comprising the steps of:

lowering the system to a depth of interest in the wellbore;

actuating the locking mechanism by applying direct current to the mechanism;

applying a broadband alternating current to the mechanism;

processing signals, generated by the system as a result of applying the broadband alternating current, in a spectrum analyzer;

applying an output of the spectrum analyzer, representing frequency content of the signals generated by the system in response to the broadband alternating current, to an inverse filter generator and generating an inverse filter operator;

conducting a geophysical survey at the depth of interest; and convolving a result of the geophysical survey with the inverse filter operator, whereby the result of the geophysical survey is adjusted to reduce an effect of the response of the system to partial acoustic coupling.

* * * * *